US008147889B2

(12) United States Patent
Kirkpatrick et al.

(10) Patent No.: US 8,147,889 B2
(45) Date of Patent: Apr. 3, 2012

(54) METHOD FOR TREATING RAW AND PROCESSED GRAINS AND STARCHES

(75) Inventors: Robin Duncan Kirkpatrick, Johannesburg (ZA); Nickolas Speakman, Chelmsford (GB)

(73) Assignee: Giant Trading Inc. (PA)

( * ) Notice: Subject to any disclaimer, the term of this patent is extended or adjusted under 35 U.S.C. 154(b) by 476 days.

(21) Appl. No.: 11/972,717

(22) Filed: Jan. 11, 2008

(65) Prior Publication Data

US 2008/0260922 A1  Oct. 23, 2008

Related U.S. Application Data

(60) Provisional application No. 60/884,664, filed on Jan. 12, 2007.

(51) Int. Cl.
*A21D 2/02* (2006.01)
*A23L 1/00* (2006.01)
*A23L 1/10* (2006.01)
*B02B 5/00* (2006.01)
*B02C 9/04* (2006.01)

(52) U.S. Cl. ............ 426/331; 426/618; 426/455; 241/6; 241/8; 241/9

(58) Field of Classification Search ............... 426/9, 18, 426/253, 258, 288, 331, 554, 618, 455; 241/6, 241/8, 9
See application file for complete search history.

(56) References Cited

U.S. PATENT DOCUMENTS

| 2,413,472 A | * | 12/1946 | Sullivan | 241/8 |
|---|---|---|---|---|
| 3,616,355 A | | 10/1971 | Themy et al. | |
| 3,667,523 A | * | 6/1972 | Lynn et al. | 426/442 |
| 3,819,329 A | | 6/1974 | Kaestner et al. | |
| 3,996,386 A | | 12/1976 | Malkki et al. | |
| 4,317,841 A | | 3/1982 | Brambilla et al. | |
| 5,427,667 A | | 6/1995 | Bakhir et al. | |
| 5,540,819 A | | 7/1996 | Bakhir et al. | |
| 5,558,886 A | | 9/1996 | Martinez-Bustos et al. | |
| 5,628,888 A | | 5/1997 | Bakhir et al. | |
| 5,635,040 A | | 6/1997 | Bakhir et al. | |
| 5,674,537 A | | 10/1997 | Morrow | |
| 5,871,623 A | | 2/1999 | Bakhir et al. | |
| 5,902,619 A | | 5/1999 | Rubow et al. | |
| 5,932,171 A | | 8/1999 | Malchesky | |
| 5,985,110 A | | 11/1999 | Bakhir et al. | |
| 6,103,286 A | | 8/2000 | Gutzmann et al. | |
| 6,326,048 B1 | | 12/2001 | Kato et al. | |
| 6,610,249 B1 | | 8/2003 | Hinze | |
| 6,623,695 B2 | | 9/2003 | Malchesky et al. | |
| 7,090,753 B2 | | 8/2006 | Sumita | |
| 7,238,381 B2 | * | 7/2007 | Macaluso | 426/632 |
| 2002/0113017 A1 | | 8/2002 | Sheets | |
| 2004/0232007 A1 | | 11/2004 | Carson et al. | |

FOREIGN PATENT DOCUMENTS

| EP | 0842122 | 8/2000 |
|---|---|---|
| RU | 2 181 544 C2 | 4/2002 |
| RU | 2 195 125 C2 | 12/2002 |
| RU | 2 203 936 C2 | 5/2003 |
| RU | 2 262 851 | 10/2005 |
| RU | 2 262 852 | 10/2005 |
| WO | WO 9920287 | 4/1999 |
| WO | WO 9928238 | 6/1999 |
| WO | WO 2008084407 A2 | 7/2008 |

OTHER PUBLICATIONS

PCT Search Report for PCT/IB2008/00672 for "Method for Treating Raw and Processed Grains and Startches", PCT Filing Date Jan. 11, 2008.
Shirahata, et al., "Electrolyzed-Reduced Water Scavenges Active Oxygen Species and Protects DNA From Oxidative Damage", Mar. 21, 1997, pp. 269-274, No. 234, Publisher: Biochemical and Biophysical Research Communications, Published in: US.
Skaliy et al., "Laboratory studies of disinfectants against *Legionella pneumophila*", "Applied and Environmental Microbiology", Oct. 1980, pp. 697-700, vol. 40, No. 4, Publisher: Center for Disease Control, Published in: Atlanta, Georgia.
Tatsuo et al., "Apparatus for water treatment by electrolysis", Dec. 19, 1995, Published in: Japan.
Straw et al., "Interactions of management and animal performance in a swine feed", 1985.
Tubbs, "Controlling coccidiosis in neonatal pigs", 1988.
Mukherjee, "Occurrence of *Escherichia coli*, Newcastle disease virus and infections bursal disease virus in broilers", 1994.
Sizikov, "Disinfecting soln. of use in hospitals, etc.".
Fraser, C.M., et al., "The Merck Veterinary Manuarl", 1991, pp. 190, 1529-1531, Publisher: Merck & Co., Inc., Published in: N.J.
Kroschwitz, J.I.,et al. (Eds.) Kirk-Othmer, "Encyclopedia of Chemical Technology—Electrochemical Processing", 1994, pp. 124-141, vol. 9, Publisher: John Wiley & Sons, Published in: US.

* cited by examiner

*Primary Examiner* — Kelly Bekker
*Assistant Examiner* — Lela S Williams
(74) *Attorney, Agent, or Firm* — Fellers, Snider, Blankenship, Bailey & Tippens, P.C.; Dennis D. Brown

(57) ABSTRACT

A method of decontaminating grain, nut, or seed products and a method for conditioning grain in a milling process for decontamination and to produce an improved milled product which will yield baked goods, for example, of increased size and extended shelf life. In the decontamination and/or conditioning procedure, the grain, nut, or seed product is contacted with an aqueous anolyte product which can be undiluted or can be diluted with non-activated water. In undiluted form, the aqueous anolyte product preferably has a pH in the range of from about 4.5 to about 7.5 and a positive oxidation-reduction potential of at least $^+550$ mV.

26 Claims, No Drawings

METHOD FOR TREATING RAW AND PROCESSED GRAINS AND STARCHES

This application claims the benefit of U.S. Provisional Patent Application Ser. No. 60/884,664, filed on Jan. 12, 2007, the disclosure of which is incorporated herein by reference as if fully set out at this point.

FIELD OF THE INVENTION

This invention relates to a method for treating grains, nuts and oil seeds in the food, industrial starch and animal feed products industry. In particular, it concerns surface treatment of grain during processing so as to achieve optimal microbial and chemical decontamination of in-process, partly processed and final products in the grain milling and baking industries. In addition, the invention includes a method for the selective manipulation of the relative proportions of processed starch derivatives. The invention also includes a method for the production of baked products derived from treated cereal starches.

BACKGROUND OF THE INVENTION

Processing of grain has been one of the fastest growing agricultural markets internationally in the past twenty years. Each day, thousands of tons of grain arrive at processing facilities before being converted to food, industrial and feed products. Optimal decontamination of these grain products is a critical factor in determining final product quality, not only from an economic perspective, but particularly from a human and animal safety perspective.

As used herein, the term "grain" includes within its scope, but is not limited to, barley, wheat, maize, rye, oats, corn and the grains of any other cereal crops from which starch can be extracted.

Industrial Treatment of Grain

Upon arriving at an industrial grain mill, a grain shipment is first graded according to, inter alia, color, size, level of microbial, mycotoxin and chemical contamination, moisture, oil and protein content, after which the grain is weighed and cleaned in a preliminary first stage screening process to remove dust, chaff and foreign materials. The grain subsequently undergoes a second stage water conditioning process, during which the conditioning water is added to the grain to soften the husks. During this stage, the grain kernels absorb water, which elevates the moisture levels and results in an increase in grain size. This grain is then conveyed to conditioning bins where it resides for anything from 30 minutes to a few hours in the case of the maize and corn milling processes, and up to about 48 hours in wheat milling processes, essentially to permit optimal mobilization of the endosperm and to ease germ extraction In some instances, tempered grain is subjected to a second dampening and may be further processed through a mechanical surface decontaminator such as the DCPeeler MHXL-W from Buhler AG, which removes the outermost layer (pericarp) of the softened grains and with it contaminating superficial bacteria, mycotoxins and toxic heavy metals.

Thereafter the softened husks are removed and the grain is coarsely ground to break the grain germ, also known as the embryo, loose from other components, such as the endosperm and fiber. The ground grain is carried to degerminators, where the germ is separated and retained for further processing, e.g. extraction of oils, while the germ residue may be used in animal feeds. The grain is further treated in a dry milling process through a series of roller mills, sifters and purifiers to produce finished product flour, meal or the like-milled product.

Those who are engaged in the grain treatment and milling industry will appreciate that there is always a level of superficial contamination on grain surfaces, including dormant toxigenic fungal spores. Upon coming into contact with water these dormant spores develop into a vegetative form of the fungus, whose growth may cause the release of harmful mycotoxins, which may comprise Aflatoxins, Deoxynivalenol toxins, Ochratoxins, Vomerotoxins, Fumonisins and Zearelenone.

The introduction of conditioning water during the second stage water cleaning process is a critical step in grain milling since it provides the only substantial opportunity for impacting upon the microbial quality levels of the final milled product. However, in an essentially dry milling process, the volume of conditioning water introduced must be such that the total grain moisture content after treatment does not exceed 20%, and most preferably be closer to 13% or 18% depending on the grain type. This restriction is set to manage the downstream handling and milling of the grain, and to prevent carry-over of moisture into the final starch-based product. Unless stated otherwise, all grain moisture percentages discussed herein are percentages by weight.

The difficulty in practice is that the quantity of conditioning water that is permitted per ton of grain to be processed such as not to exceed the maximum permissible grain moisture content limit, is substantially inadequate to achieve effective grain surface coating and thus optimal microbial, mycotoxin and chemical decontamination of the grain surface. This limited quantity of conditioning water is, however, sufficient to enable the superficial fungal spores to become vegetative, thus resulting in microbial spoilage and an increased potential for mycotoxin generation.

This problem is exacerbated in wheat milling processes where, because of a much smaller grain size in comparison to that of maize or corn for example, hydration of treated wheat grain in the conditioning bins requires substantially longer periods of time, hence providing a significantly increased opportunity for general microbial growth, and in particular toxigenic fungal growth, on the wheat grain surface.

In an effort to address the problem of fungal growth and mycotoxin accumulation on the grain surface, chemicals and in particular molecular chlorine (as generated by an Aquachlor or equivalent device) and stabilized chlorine-based solutions are often added to the conditioning water to assist with surface decontamination. However, molecular and stabilized chlorine-based solutions are noxious and pose a risk that introduction of such solutions into the conditioning water may lead to the creation of hazardous chlorine or derivative residues on the final grain product, which may be detrimental for human or animal consumption.

Alternatively, mechanical peeling of grain surfaces to remove bacterial, superficial chemical residues and heavy metal contaminants after primary conditioning, may not be sufficiently effective in the optimal peeling of the entire surface of all grains in the batch undergoing processing. Such equipment while claiming substantive decontamination efficacy are unlikely to afford adequate assurance in terms of chemical and microbial sanitation security.

Another risk is the potential for carry-over of chemical decontaminants, particularly molecular and stabilized chlorine-based remedies, into the final flour product. This is a substantial problem in the baking industry, wherein residual chlorine may adversely impact upon the viability of commercial yeast additives that are required during the fermentation process for the leavening of bread dough. Where low concentrations of chemicals, in particular molecular and stabilized chlorine-based solutions, are used for treating conditioning water to obviate any unwanted residues on the grain surfaces, these levels are inevitably too low to afford adequate biocidal capacity, and may promote the development of tolerance by the same microbes to the chemical agents in use.

Baking Industry

In wheat grains, readily available fermentable sugar molecules, e.g. glucose, fructose, maltose and sucrose, serve as metabolic building blocks that are necessary to optimize anaerobic fermentation by commercial yeast strains to generate carbon dioxide, which in turn is essential for the final size, shape and consistency of the baked product. These fermentable sugars are produced by enzymes, amongst others alpha-amylases, which are naturally present in the grain and which serve to assist in the cleaving of discrete sugar molecules from the raw starch aggregate. It is the quantity of these readily available, fermentable sugars which are critical to the pace and magnitude of the anaerobic fermentation as a precursor to the baking process.

However, wild strain and in-process microbial contaminants compete with the commercial yeasts for these fermentable sugars, and serve to compromise optimal and controlled fermentation in the dough mixture, thus resulting in a final baked product with high levels of spoilage microbes and consequently a reduced shelf-life.

In one effort to overcome this uncontrolled contamination, bromate-based oxidants (e.g. potassium bromate) and other oxidants, including ascorbic acid, azodicarbonamide, benzoyl peroxide, chlorine and calcium iodate, are added during the baking process to facilitate water decontamination, flour bleaching, starch mobilization and maturation. However, many of these chemicals may be carcinogenic and as such do not pose a suitable or wholesome solution. In addition, benzoyl peroxide only bleaches carotenoids normally present in flour, but does not have any significant effect on microbial contamination or the color of bran particles.

ECA Solutions

It is well known that production of electrochemically activated (ECA) solutions from diluted dissociative salt solutions involves passing an electrical current through an electrolyte solution in order to produce separable catholyte and anolyte solutions. Those who are engaged in the industry will appreciate that catholyte, which is the solution exiting the cathodic chamber, is an anti-oxidant and normally has a pH of between 8 and 13, and an oxidation-reduction (redox) potential (ORP) of between −200 mV and −1100 mV. The anolyte, which is the solution exiting the anodic chamber, is an oxidant and is generally an acidic solution with a pH of between 2 and 8, and an ORP of between +300 mV and +1200 mV.

During electrochemical activation of aqueous electrolyte solutions, various oxidative and reductive species are present in solution, for example HOCl (hypochlorous acid); $ClO_2$ (chlorine dioxide); $ClO_2^-$ (chlorite); $ClO_3^-$ (chlorate); $ClO_4^-$ (perchlorate); $OCl^-$ (hypochlorite); $Cl_2$ (chloride); $O_2$ (oxygen); $OH^-$ (hydroxyl); and $H_2$ (hydrogen). The presence or absence of any particular reactive species in solution is predominantly influenced by the derivative salt and the pH of the final solution. So, for example, at pH 3 or below, HOCl converts to $Cl_2$, which substantially increases toxicity levels. At pH below 5, low chloride concentrations produce HOCl, but high chloride concentrations will produce $Cl_2$ gas. At pH above 7.5 hypochlorite ions ($OCl^-$) are the dominant species. At pH>9 the oxidants (chlorites, hypochlorites) convert to non-oxidants (chloride, chlorates, perchlorates) and active chlorine (i.e. defined as $Cl_2$, HOCl and $ClO^-$) is lost due to the conversion to chlorate ($ClO_3^-$). At a pH of 4.5-7.5, the predominant species are HOCl (hypochlorous acid), $O_3$ (ozone), $O_2^{2-}$ (peroxide ions) and $O_2^-$ (superoxide ions).

For this reason, anolyte predominantly comprises species such as ClO; $ClO^-$; HOCl; $OH^-$; $HO_2$; $H_2O_2$; $O_3$; $S_2O_8^{2-}$ and $Cl_2O_6^{2-}$, while catholyte predominantly comprises species such as NaOH; KOH; $Ca(OH)_2$; Mg $(OH)_2$; $HO^-$; $H_3O_2^-$; $HO_2^-$; $H_2O_2^-$; $O_2^-$; $OH^-$ and $O_2^2$. The order of oxidizing power of these species is: HOCl (strongest)>$Cl_2$>$OCl^-$ (least powerful). For this reason anolyte has a much higher antimicrobial and disinfectant efficacy in comparison to that of catholyte.

RU 2,181,544 suggests a process for improving the quality of baked goods by introducing an electrochemically treated sodium hydrocarbonate solution of pH 9.0-10.0 and an ORP of between −680 mV and −813 mV. In this pH range and using sodium hydrocarbonate, a catholyte solution is produced, which has a low decontamination and sterilization efficacy. Moreover, in theory, HighTest Hypochlorite (HTH) and hypochlorous acid are off-gassed at the alkaline pH. Russian chemical texts suggest the gassing product is chlorine gas which is a product of decomposition of hypochlorite or hypochlorous acid (some believe it is chlorine monoxide-anhydride). Either one is toxic, even in low concentrations, due to irritation to mucous membranes and the respiratory system. The amount of gas released is proportional to the concentration of active chlorine in solution, the state of aggregation, temperature and pH.

RU 2,195,125 proposes increasing the efficiency of grain decontamination in the food industry by (i) washing the grains in an electrochemically activated aqueous catholyte solution of pH 11.0-11.5 and an ORP of −820 mV--870 mV for 10-12 hours; and (ii) then conducting grain steeping in an electrochemically activated aqueous anolyte solution of pH 2.0-2.5 and an ORP of 1000 mV-11400 mV for 1-1.5 hours. The grain is subsequently germinated at room temperature for 8-10 hours up to a germ length of not more than 1.5 mm.

The first disadvantage of this process is that catholyte at a pH of 11.0-11.5, comprises predominantly chlorides, chlorates and perchlorates, and all reactive chlorine is lost. Accordingly, the catholyte treatment step provides very low decontamination and disinfectant efficacy. The second disadvantage is that subsequent introduction of acidic anolyte results in steeping being done at high $Cl_2$ levels, where all HOCl is converted to $Cl_2$, thus significantly increasing toxicity whilst reducing potential antimicrobial efficacy levels. In fact, as little as 350 ppm HOCl yields as much as 50 ppm $Cl_2$, which is considered toxic to the respiratory tract. No mention is made of dose and thus final chlorine concentration, but one can extrapolate that treatment with acidic anolyte substantially increases the risk of high levels of residual chlorine being carried over into the final milled product.

RU 2,203,936 discloses a method for preparing water for use in various stages of brewage grains using electrochemically activated aqueous salt solution that is prepared from a salt solution comprising 10 grams of salt per liter water. It suggests using anolyte with a concentration of active chlorine in an amount of 0.03%-0.06% for processing of seed yeasts. This equates to about 300-600 ppm chlorine. Notwithstanding the adverse impact upon the viability of the yeast organisms, a level of chlorine as low as 50 ppm as mentioned above, is already considered toxic to the respiratory tract and thus the recommended inclusion rate renders this remedy massively noxious to any procedure for the generation of food for human consumption.

SUMMARY OF THE INVENTION

It is an object of the present invention to provide a new method of treating grain, particularly in the food, industrial starch and animal feed products industry, to reduce the presence of superficial bacterial and fungal contaminants that may proliferate during grain steeping and conditioning, and thereby to reduce the likelihood of new fungal contamination and thus mycotoxin production, while at the same time replacing currently used harmful chemicals.

It is another object of the invention to introduce a non-toxic, superficial decontaminating remedy for in-process usage during grain treatment, comprising predominantly HOCl, which is substantially more effective at killing harmful pathogens than hypochlorite, the major constituent of bleach.

It is another object of the invention to provide a method for the reduction of contaminating heavy metal elements from conditioning water as well as the surfaces of grains by reducing said metals as insoluble hydroxide precipitates in the conditioning solution as well as upon the husk and pericarp. The invention also involves a specific method for the treatment of bran for the reduction of heavy metal contamination as well as bleaching prior to addition as an ingredient into a flour mix during the production of high fiber, bran based, baked products.

It is another object of the invention to provide a grain treatment method for eliminating, or at least reducing microbes comprising wild-strain fungal contaminants, and including yeasts that may compete for starch derived fermentable sugars, from the grain surface, thus enhancing the non-competitive and unimpeded growth potential of commercial strains of yeasts destined for further processing of grain-based starch, and particularly to effect optimal utilization of a finite resource of these natural sugars in the baking industry, within a fixed period of time as predetermined by normal baking practices.

It is a further object of the invention to provide a grain treatment method for increasing the quality and quantity of readily available fermentable sugars in milled flour, which may result in the production of baked wheat grain products of substantially greater size, enhanced quality and extended shelf-life, as described by the standard Chorleywood assessment.

It is a further object of the invention to provide for a grain treatment method for the reduction of mycotoxin levels both on the surface as well as within the body of the grain.

It is yet another object of the invention to produce non-chlorinated wheat flours as required for high ratio cakes and bread.

It is another object of the invention to provide a superficial grain treatment method that will assist in reducing contamination of the extracted grain germ with spoilage microbes so as to improve keeping quality and limit constituent peroxidation, thereby limiting the generation of free fatty acids, which may contribute to rancidity of subsequently extracted oils products.

In one aspect, there is provided a method for reducing contaminants on a surface of a product, the product being a grain product, a nut product, or a seed product and the process comprising the step of contacting the surface of the product with an amount of an aqueous anolyte product effective for at least reducing an amount of bacteria, an amount of fungus, an amount of yeast, or a combination thereof on the surface. The aqueous anolyte product used in the inventive method is one which, when in undiluted form, has a pH in the range of from about 4.5 to about 7.5 and a positive oxidation-reduction potential of at least $^+550$ mV. The aqueous anolyte product can be undiluted or can be used in the step of contacting in the form of a diluted anolyte composition comprising the aqueous anolyte product and an amount of non-electrochemically activated water, the amount of non-electrochemically activated water being at least 50% by weight of the diluted anolyte composition.

This method can also optionally further comprise the step of contacting the surface of the product with an amount of an aqueous catholyte product effective for at least reducing an amount of mycotoxin on the surface wherein, when in undiluted form, the aqueous catholyte product has a pH in the range of from about 8 to about 13 and a negative oxidation-reduction potential of at least $^-700$ mV.

In another aspect, there is provide a method of processing grain comprising the steps of: (a) conditioning the grain, prior to milling, by contacting the grain with an amount of an aqueous conditioning fluid effective to increase a moisture content of the grain, the aqueous conditioning fluid at least partially comprising an aqueous anolyte product wherein, when in undiluted form, the aqueous anolyte product has a pH in the range of from about 4.5 to about 7.5 and a positive oxidation-reduction potential of at least $^+550$ mV and (b) milling the grain to produce a milled product. The method can further comprise the steps, after step (a) and prior to step (b), of removing at least an outer layer from the grain and removing a grain germ material from the grain.

In another aspect, there is provided a method comprising the steps of forming a dough comprising flour and yeast and baking the dough to produce a baked product having a finished volumetric size per a given weight amount of the flour used in forming the dough. The improvement to this method comprises the flour used in forming the dough being a flour product which has been produced by a process comprising the steps of: (a) contacting grain, prior to milling, with an amount of an aqueous conditioning fluid to increase a moisture content of the grain, and (b) milling the grain. The aqueous conditioning fluid at least partially comprises an amount of an aqueous anolyte product wherein, when in undiluted form, the aqueous anolyte product has a pH in the range of from about 4.5 to about 7.5 and a positive oxidation-reduction potential of at least $^+550$ mV. The amount of the aqueous anolyte product in the aqueous conditioning fluid and the amount of the aqueous conditioning fluid which was used in the step of contacting are effective for increasing the finished volumetric size of the baked product per the given weight amount of the flour used in forming the dough. The concentration of the aqueous anolyte product in the conditioning fluid and the amount of aqueous conditioning fluid which was used will preferably be effective for increasing the volumetric size of the baked product by at least 6.78%. The concentration of the aqueous anolyte product and the amount of conditioning fluid which was used will more preferably be effective for increasing the finished volumetric size of the baked product by at least 9.15% and will most preferably be effective for increasing the finished volumetric size of the baked product by at least 10.53%.

In each embodiment of the inventive method, the aqueous anolyte product used in the contacting or conditioning step will preferably have a free active oxidant concentration of less than 250 ppm. In addition, the aqueous anolyte product will preferably have a positive oxidation-reduction potential of at least $^+650$ mV and will preferably have a pH in the range of from about 5.5 to about 7. It is also preferred that the aqueous anolyte product be an anode product which has been produced by electrochemical activation of an aqueous salt solution comprising from about 1 to about 9 grams of salt per liter of water. The sale used in the aqueous salt solution will preferably be sodium chloride, sodium carbonate, sodium bicarbonate, or a combination thereof. When used in diluted form, the diluted anolyte composition will preferably comprise the aqueous anolyte product and non-electrochemically activated water such that the aqueous anolyte product is present in the diluted anolyte composition in a concentration of at least 1% by weight and the non-electrochemically activated water is present in the diluted anolyte composition in a concentration of at least 50% by weight.

Further aspects, features, and advantages of the present invention will be apparent to those of ordinary skill in the art upon reading the following detailed description of the preferred embodiments.

DETAILED DESCRIPTION OF THE PREFERRED EMBODIMENTS

According to the invention there is provided a method of treating grain, nuts, or seeds including in one aspect a conditioning phase in which the grain, nuts, or seeds is/are washed with treated conditioning water, the method being characterized therein that during the conditioning phase the grain is brought into contact with an electrochemically activated aqueous anolyte solution with a pH in the range of from about 4.5 to about 7.5 an ORP in the range of from about +550 mV to about +900 mV and a Free Active Oxidant concentration of <250 ppm. The amount of this anolyte used as or in the contacting and/or conditioning fluid will preferably be sufficient to equate to at least 9.3 liters of undiluted anolyte per ton of grain.

The anolyte may be produced from electrochemically activating a dilute aqueous saline solution comprising from about 1 to about 9 grams of salt per liter of water. The saline solution preferably may comprise 2 to 3 grams of salt per liter of water.

The salt may be any inorganic salt. In particular, the salt will preferably be sodium chloride (NaCl), sodium carbonate ($NaCO_3$), or sodium bicarbonate ($NaHCO_3$).

The method may include the step of on-site production of the anolyte solution, comprising the steps of electrochemically activating a dilute electrolyte solution in an electrochemical reactor comprising an anodic and a cathodic chamber and capable of producing separable electrochemically activated aqueous anolyte and catholyte solutions; separately harvesting the catholyte solution; reintroducing the catholyte solution into the anodic chamber in the absence of any fresh water; and manipulating the flow rate, hydraulic flow regime, pressure and temperature of the catholyte through the anodic chamber, so as to produce an anolyte solution that is characterized therein that it predominantly includes the species HOCl (hypochlorous acid), $O_3$ (ozone), $O_2^{2-}$ (peroxide ions) and $O^{2-}$ (superoxide ions), and having a mixed oxidant concentration of less than 250 ppm.

The pH of the anolyte will preferably be in the range of from about 5.5 to about 7.

The method particularly may provide for the surface treatment of the grain before it is processed, particularly during a dry milling process, in the food, industrial starch and animal feed products industry, by introducing the anolyte into the conditioning water of the steeping or conditioning phase. The anolyte can be introduced into the conditioning water at a concentration of up to 50%. Preferably, the anolyte will be introduced into the conditioning water at a concentration of less than 20% in corn or maize conditioning solutions, and less than 35% in wheat conditioning solutions. The anolyte treated water may be applied as a continuous or episodic spray, mist, fog, steam, wash, immersion, a combination of two or more or as a substantial equivalent of any of the aforementioned.

Alternatively, the method may comprise selectively washing the grain, nuts or seeds with undiluted anolyte solutions where high levels of oxidant-based antimicrobial decontamination are required, such as during the production of ingredients for infant food products.

The method also may be used in the treatment of grain in a wet milling process, such as malting, where the moisture content may be up to 50% by weight.

The method can include a further step of selectively administering anti-oxidant electrochemically activated aqueous catholyte solution as a preconditioning grain, nut or seed wash for superficial heavy metal and mycotoxin neutralization, the catholyte preferably having a pH in the range of from about 8 to about 13, and an ORP of at least −700 mV (i.e., a negative ORP of at least −700 mV such that ORPs of, for example, −800 mV and −900 mV would constitute succeedingly "higher" negative values), for a period of exposure that is commensurate with the degree of mycotoxin elimination required and which is economically permissible under commercial detoxification procedures appropriate to the industry.

The anolyte can be introduced at ambient temperature as per standard operating conditions. The anolyte preferably will be introduced at a temperature in the range of from about 5° C. to about 45° C. The duration of the anolyte contact with the grain surface will be directly dependent upon the surface area of the grain relative to its mass, as well as the hygroscopic nature of the grain as described by the initial moisture level, which in turn will predict the permissible volume of anolyte treated conditioning solution that will be required to increase the final moisture level of the conditioned grain to the recognized industry standards for the given grain type. Additionally, absorption of conditioning solutions by 'hard grains' with a high protein content will differ substantially from 'soft grains' of relatively lower protein content.

The method can include the further step of bleaching the grain, such as bran, by washing a separated grain component in an acidic anolyte solution with a pH in the range of from about 2 to about 5 and an ORP of $>^+1000$ mV (i.e., a positive ORP of greater than +1000 mV such that the ORPs of, for example, $^+1000$ mV and $^+1200$ mV would constitute succeedingly "higher" positive values). Said method would also be appropriate for the neutralization of superficial chemical contaminating residues such as, but not restricted to, organophosphate based pesticides. The method would permit the application of the anolyte solutions as a continuous or episodic spray, mist, fog, steam, wash, immersion, a combination of two or more, or as a substantial equivalent of any of the aforementioned.

The method may include yet a further decontamination step of adding electrochemically activated aqueous anolyte solution with a pH in the range of from about 4.5 to about 7.5, an ORP in the range of from about +550 mV to $\geq$+900 mV, and a Free Active Oxidant concentration of <250 ppm as an additive during a baking process, this step being largely but not exclusively restricted to being a dough ingredient during a baking process.

The invention extends to the use of an electrochemically activated aqueous anolyte solution as a conditioning agent during a conditioning phase in a grain treatment process, particularly in the food, industrial starch and animal feed products industry, the use comprising the step of bringing the grain into contact with an anolyte solution with a pH in the range of from about 4.5 to about 7.5, an ORP in the range of from about +550 mV to $\geq$+900 mV and a Free Active Oxidant concentration of <250 ppm, either by introducing the anolyte into conditioning water, or by directly washing the grain with undiluted anolyte.

The invention includes an electrochemically activated aqueous anolyte solution with a pH in the range of from about 4.5 to about 7.5 and an ORP in the range of from about +650 mV to ≧+900 mV for use as a conditioning agent during grain, nut, or seed decontamination in the food, industrial starch and animal feed products industry.

The invention extends to the use of an electrochemically activated aqueous anolyte solution as a bleaching and maturing agent in the baking industry, the use comprising the step of adding an anolyte solution with a pH in the range of from about 4.5 to about 7.5, an ORP in the range of from about +550 mV to ≧+900 mV and a Free Active Oxidant concentration of <250 ppm either directly to flour at a mill, or as a dough ingredient in a bakery.

The invention includes an electrochemically activated aqueous anolyte solution with a pH in the range of from about 4.5 to about 7.5 and an ORP in the range of from about +650 mV to ≧+900 mV for use as a bleaching and maturing agent in the baking industry.

Without limiting the scope thereof, the invention will now further be described and exemplified with reference to the following examples and experimental results.

EXAMPLE 1

Evaluation of Two Anolytes for their Ability to Inhibit Fungal Development During a First Conditioning Stage in a Maize (Corn) Milling Process (CSIR Food Science and Technology—Food Quality Program (Foodtek))

Fungi, such as so-called "storage fungi", tend to develop during a milling process when moisture contents are increased above 14%. Many of these fungi produce harmful toxic substances that can cause disease symptoms, cancer and even death in humans and animals. Due to the significance of fungi in the milling process of maize, the applicant approached Foodtek to investigate the ability of two undiluted anolytes of different characteristics when applied at different inclusion rates, to inhibit growth of general fungal contaminants during a first conditioning stage. Anolyte 1 had a substantially neutral pH of from 6.5 to 7.5 and an ORP≧850 mV, while anolyte 2 had an acidic pH of from 5.5 to 6.5 and an ORP≧1000 mV. The EC of both solutions was ≦5.1 mS/cm.

Methodology

White maize or corn kernels were received from Delmas Milling in Randfontein. The moisture content of these kernels was determined (12.07%), and this was then used to set the final moisture level of the different conditioned maize samples at either 14% or 16.5%. The final moisture levels were achieved by conditioning the kernels using both of the two anolyte solutions or standard tap water. All solutions were applied as a superficial spray and the grains were agitated by continuous tumbling in a sealed container until all moisture had been absorbed. Post-conditioning moisture levels were assessed in accordance with standard drying procedures. The following treatments were used:

TABLE 1

Sample treatment permutations for the Anolyte antifungal assays

| Description | Moisture content |
|---|---|
| Maize received from Delmas Milling: Fungal enumeration was done to determine the initial fungi present. | 12.07% |
| Control: Enumeration was done to determine the fungal development after 8 hours of conditioning at the set moisture content. | 14% |
| Anolyte 1: Enumeration was done to determine the fungal development after 8 hours of conditioning at the set moisture content. | 14% |
| Anolyte 2: Enumeration was done to determine the fungal development after 8 hours of conditioning at the set moisture content. | 14% |
| Control: Enumeration was done to determine the fungal development after 8 hours of conditioning at the set moisture content. | 16.5% |
| Anolyte 1: Enumeration was done to determine the fungal development after 8 hours of conditioning at the set moisture content. | 16.5% |
| Anolyte 2: Enumeration was done to determine the fungal development after 8 hours of conditioning at the set moisture content. | 16.5% |

After conditioning for 8 hours at 30° C., kernels were rinsed with sterilized distilled water and then plated on three different media to determine all fungal species present. The results are summarized in Table 2 on page 13, and reflect the relative prevalence (percentage—%) of the different fungal species between the different treatment groups after a simulated 8 hour conditioning.

TABLE 2

Percentage fungal infestation of treated and untreated maize samples after simulating of the first stage conditioning.

| Description | Maize from Delmas | Control | Anolyte 1 | Anolyte 2 | Control | Anolyte 1 | Anolyte 2 |
|---|---|---|---|---|---|---|---|
| Moisture | 12.07% | 14% | 14% | 14% | 16.5% | 16.5% | 16.5% |
| *Aspergillus candidus* | | 2 | 5 | 5 | 2 | 11 | 6 |
| *Aspergillus flavus* | 16 | 14 | 12 | 9 | 26 | 15 | 13 |
| *Aspergillus niger* | 14 | 20 | 2 | 11 | 12 | 14 | 9 |
| *Aspergillus ochraceus* | | 1 | | | 2 | | |
| *Aspergillus terreus* | 1 | | | | 1 | | |
| *Aspergillus versicolor* | | 1 | | | 1 | | |
| *Aspergillus wentii* | 1 | 3 | | 1 | 1 | | |
| *Cladosporium* spp. | 4 | | | 10 | | | |
| *Diplodia maydis* | 9 | 6 | 3 | 6 | 6 | 7 | 6 |
| *Eurotium* spp. | 78 | 25 | 59 | 43 | 32 | 57 | 71 |
| *Fusarium chlamydosporum* | | 1 | | 1 | | | |
| *Fusarium graminearum* | 1 | 3 | 2 | 4 | 4 | 12 | 3 |
| *Fusarium moniliforme* | 100 | 100 | 100 | 100 | 100 | 100 | 100 |
| *Mucor* spp. | 32 | 90 | 78 | | 47 | 53 | 63 |
| *Penicillium* spp. | 98 | 100 | 98 | 100 | 100 | 100 | 95 |

TABLE 2-continued

Percentage fungal infestation of treated and untreated maize samples after simulating of the first stage conditioning.

| Description | Maize from Delmas | Control | Anolyte 1 | Anolyte 2 | Control | Anolyte 1 | Anolyte 2 |
|---|---|---|---|---|---|---|---|
| *Rhizopus oryzae* | 55 | 20 | 15 | | 9 | | |
| *Trichoderma* spp. | 10 | 26 | 23 | 22 | 97 | 9 | |

Results

A wide variety of fungi were identified from all samples, including both field- and storage fungi. This provided an opportunity to look at the effect of a wide range of problematic fungi.

(i) *Aspergillus flavus* is known to produce the mycotoxin, aflatoxin, which causes liver damage and cancer in humans. These types of mycotoxins are regarded as the most carcinogenic substances known to man. Results showed a slight decline in the presence of this fungus with both anolytes although slightly lower, but not significantly, in Anolyte 2. Normally this fungus is not associated with maize in South Africa, unless the storage or processing conditions are favorable to this fungus.

(ii) It seems that most of the *Aspergillus* species, known to be mostly storage fungi, were absent when treated with both anolytes at both moisture contents. Most of these fungi produce a wide range of mycotoxins which have detrimental effects on human health.

(iii) Field fungi such as *Maydis* and *Fusarium* species seem not to be influenced by the anolytes. These fungi are known to be deep set in the maize kernels and are not easily reached by fungicidal or fungistatic compounds. These fungi colonize the maize kernels during cultivation in the field and, therefore, have already done the damage when the raw material is delivered at a miller or storage facility. The fungal material and their mycotoxins cannot be physically removed and, therefore, prevention is better than cure. On the other hand, storage fungi develop during the storage and processing stage and can be eliminated before damage is caused to the kernels.

(iv) The presence of *Penicillium* spp. was extremely high in all samples. However, it was observed that the growth rate of these fungi, on kernels treated with Anolyte 1 and 2 respectively, was to some extent inhibited on the growth media. This is not clear in the results Table 2 but was observed in the laboratory. These fungi are also associated with poor storage and processing conditions and some species are known to produce as much as 13 different mycotoxins.

(v) It seems that *Rhizopus oryzae* is sensitive to both anolytes, especially Anolyte 2.

(vi) Both anolytes have inhibited *Trichoderma* spp. successfully at moisture contents of 16.5%, but not at 14%. This is possibly because of less water available or the fact that 1.5% more anolyte was used at 16.5% moisture content.

Conclusion

It was evident that especially storage fungi were affected by the two anolytes. Conversely, the limited antifungal efficacy against field fungal strains would most likely be due to the fact that both vegetative and dormant strains of field fungi are deep set within the kernels and are thus not readily reached by the anolytes. Storage fungi, however, develop at first on the outside of the kernel after which they spread to the inner parts over time. They only start to develop at moisture contents of 14% and higher during storage or during the milling process and it is therefore easier to prevent storage fungi from developing than to eliminate field fungi. In contrast to the Anolyte capability for the control of superficial contamination due to 'storage fungi', the low volume of Anolyte treated conditioning solutions applied for control of deep-seated kernel contamination will only offer limited benefit against field based fungal infestation and contamination. Secondary exposure to an Anolyte solution after degermination of field contaminated grains may offer an alternative solution for these deeper seated field contaminations.

EXAMPLE 2

Fungal Analysis of Flour Samples Milled from Wheat Grains Conditioned with Anolyte at Different Inclusion Rates Methodology Thirty nine flour samples were received and a dilution series was prepared from each flour sample, using 1 gram of flour per sample, and plated aseptically to Potato Dextrose Agar (PDA) amended with 50 mg/l rifampicin for detection of fungi and to Yeast Extract medium (YEA) for total yeast counts. Developing colonies were counted after three and seven day's incubation at 25° C.

A separate dilution series was prepared from 12 flour samples, using 1 gram per sample and plating 1 ml per dilution to Wort Agar (WA) pour plates. Developing colonies were counted after three and seven day's incubation at 25° C. for yeast and fungi, respectively. The inclusion of the Wort Agar culture assessment was undertaken to derive a more definitive count for the Yeasts as separate from the Fungi as initial counts on the PDA and YEA media did not afford a representative quantitative evaluation.

Anolyte of ORP$\geq$900 mV, EC$\leq$5.1 mS/cm and pH 5.5 to 7.5 was applied as a superficial spray either at a 20% or 50% inclusion rate in tap water as used for conditioning of the variety of wheat grain types as detailed. The sprayed grains were then agitated by means of laboratory scale mechanical tumbler to optimize grain surface exposure to the available conditioning solution. The treated grains were conditioned for 48 hours at ambient temperature before being milled under standard operating practices to yield commercial grade bread-flour. The reference to "hard" refers to grain with high protein content, while "soft" refers to grain with low protein content.

Results

Total yeast counts determined from YEA and WA plates and total fungal counts from PDA plates are indicated in Table 3.

TABLE 3

Yeast and fungal counts after three and seven days, respectively, incubated at 25° C.

| Sample description | Total yeast on YEA (×10⁴) | Total yeasts on WA (×10³) | Total fungi on PDA (×10²) | *Aspergillus* spp.[a] | *Fusarium* spp.[a] | Other identifiable fungi[b] |
|---|---|---|---|---|---|---|
| Jun. 2, 2006 Harrismith soft pre-conditioning control | 0.1 | ND[c] | 2.5 | ✓✓ | — | *Cla, Rhi* |
| Jun. 2, 2006 Hard wheat pre-conditioning control | 1.2 | ND | 2.5 | — | — | *Cla* |
| Jul. 2, 2006 Harrismith soft pure flour control | 2.5 | 3.5 | 3 | ✓✓✓ | — | *Cla, Muc, Pen, Rhi* |
| Jul. 2, 2006 Harrismith soft pure flour 20% Anolyte | 0.2 | ND | 4 | ✓✓✓ | ✓ | *Cla, Pae, Pen, Tri* |
| Jul. 2, 2006 Harrismith soft pure flour 50% Anolyte | 8.5 | 1.5 | 2.5 | ✓✓✓ | — | *Pae, Pen, Rhi* |
| Jul. 2, 2006 Harrismith soft final flour control | 4.5 | 184 | 5 | ✓✓✓ | — | *Cla, Pae, Pen, Rhi* |
| Jul. 2, 2006 Harrismith soft final flour 20% Anolyte | 1.5 | ND | 1.5 | ✓✓ | — | *Pae, Pen, Rhi* |
| Jul. 2, 2006 Harrismith soft final flour 50% Anolyte | 3.5 | 1.1 | 6.5 | ✓✓✓ | — | *Cla, Pae, Pen, Rhi* |
| Jul. 2, 2006 Harrismith soft Bran + flour control | 8 | ND | 5.5 | ✓✓✓ | ✓ | *Pae, Pen* |
| Jul. 2, 2006 Harrismith soft Bran + flour 20% Anolyte | 3.5 | ND | 1 | ✓✓✓ | — | *Pae, Pen* |
| Jul. 2, 2006 Harrismith soft Bran + flour 50% Anolyte | 2.5 | ND | 2.5 | ✓ | — | *Alt, Cla, Pae, Pen, Rhi* |
| Jul. 2, 2006 Harrismith soft post conditioning control | 12 | ND | 2 | — | ✓ | — |
| Jul. 2, 2006 Harrismith soft post conditioning 20% Anolyte | 0.1 | ND | 3 | ✓✓ | ✓ | — |
| Jul. 2, 2006 Harrismith soft post conditioning 50% Anolyte | 5 | ND | 1.5 | ✓✓ | — | *Muc, Tri* |
| Aug. 2, 2006 Soft regular pre-conditioning | 6.5 | ND | 0.5 | — | — | *Cla, Muc, Pen* |
| Aug. 2, 2006 Hard - pure flour control | 10.5 | 2.9 | 1.5 | ✓✓ | — | *Cla, Pae, Pen* |
| Aug. 2, 2006 Hard - pure flour 20% Anolyte | 6.5 | ND | 0.5 | ✓ | — | — |
| Aug. 2, 2006 Hard - pure flour 50% Anolyte | 2.5 | 0 | 0 | — | — | *Alt, Cla, Pen* |
| Aug. 2, 2006 Hard - post conditioning control | 7 | ND | 3 | — | — | *Cla* |
| Aug. 2, 2006 Hard - post conditioning 20% Anolyte | 0.4 | ND | 0.5 | — | — | — |
| Aug. 2, 2006 Hard - post conditioning 50% Anolyte | 7.5 | ND | 0.5 | — | — | *Cla* |
| Aug. 2, 2006 Hard - Bran + flour control | 2.5 | ND | 0 | — | — | *Cla* |
| Aug. 2, 2006 Hard - Bran + flour 20% Anolyte | 10 | ND | 0 | — | — | *Cla* |
| Aug. 2, 2006 Hard - Bran + flour 50% Anolyte | 1 | ND | 2 | — | ✓ | *Cla* |

TABLE 3-continued

Yeast and fungal counts after three and seven days, respectively, incubated at 25° C.

| Sample description | Total yeast on YEA ($\times 10^4$) | Total yeasts on WA ($\times 10^3$) | Total fungi on PDA ($\times 10^2$) | Aspergillus spp.[a] | Fusarium spp.[a] | Other identifiable fungi[b] |
|---|---|---|---|---|---|---|
| Aug. 2, 2006 Hard - final product control | 0.5 | 1.4 | 2.5 | ✓ | — | Cla, Pen, Rhi |
| Aug. 2, 2006 Hard - final product 20% Anolyte | 0.4 | ND | 2.5 | ✓ | — | Cla, Pen |
| Aug. 2, 2006 Hard - final product 50% Anolyte | 0.2 | 0.3 | 0.5 | ✓ | — | Cla, Pen |
| Sep. 2, 2006 Soft regular final flour control | 5 | 0.7 | 1 | ✓ | — | Muc, Pen |
| Sep. 2, 2006 Soft regular final flour 20% Anolyte | 5.5 | ND | 2 | ✓✓ | ✓ | Muc |
| Sep. 2, 2006 Soft regular final flour 50% Anolyte | 1.3 | 4.4 | 0.5 | ✓ | — | Pen |
| Sep. 2, 2006 Soft regular pre-conditioning control | 2 | 0.8 | 3 | ✓✓ | ✓ | Pen, Rhi |
| Sep. 2, 2006 Soft regular pre-conditioning 20% Anolyte | 9 | ND | 1.5 | ✓ | — | Cla, Pen |
| Sep. 2, 2006 Soft regular pre-conditioning 50% Anolyte | 3 | 1.4 | 0.5 | ✓ | ✓✓ | Cla, Muc, Pen |
| Sep. 2, 2006 Soft regular Bran + flour control | 8 | ND | 1.5 | ✓ | — | Pen |
| Sep. 2, 2006 Soft regular Bran + flour 20% Anolyte | 19 | ND | 0.5 | ✓✓ | — | Tri |
| Sep. 2, 2006 Soft regular Bran + flour 50% Anolyte | 11 | ND | 2 | ✓ | — | Cla, Muc |
| Sep. 2, 2006 Soft regular post conditioning control | 14 | ND | 0.5 | — | ✓ | Cla |
| Sep. 2, 2006 Soft regular post conditioning 20% Anolyte | 6 | ND | 1.5 | — | — | Rhi |
| Sep. 2, 2006 Soft regular post conditioning 50% Anolyte | 4 | ND | 0 | — | ✓ | — |

[a]Detection of Aspergillus and Fusarium spp. is indicated as absent (—) or present in low (✓), medium (✓✓) and high (✓✓✓) levels.
[b]Alt = Alternaria; Cla = Cladosporium; Muc = Mucor; Pae = Paecilomyces; Pen = Penicillium; Rhi = Rhizopus; Tri = Trichoderma.
[c]ND = not determined.

Conclusion

Exposure of wheat grains to anolyte of different strengths as a conditioning solution suggests a substantial reduction of superficial and embedded fungal contaminants in both low as well as high protein grain types. Moreover, there was a substantial decrease in the level of both the variety and number of yeast and fungal contaminants when the flour was sampled over an extended time period after initial anolyte treatment, thus suggesting that grains exposed to anolyte during conditioning may retain a residual antifungal effect with a progressive reduction of microbial contaminants over time.

EXAMPLE 3

Efficacy of Anolyte in Controlling Surface Micro-Flora of Maize Kernels

Methodology

Ten maize kernels of indeterminate microbial contamination levels were incubated for 8 minutes in different anolyte dilutions. The undiluted Anolyte had an ORP (REDOX potential) of +899 mV, a pH of 6.8-7.0 and an electrical conductivity of 5.78 mSiemens/cm. Thereafter, 5 kernels were placed on Nutrient Agar (Biolab) for assessment of Anolyte efficacy against Aerobic bacteria (Sample A) and the remaining 5 kernels were placed on Potato Dextrose Agar (Biolab) as an assessment of Anolyte efficacy against yeasts and moulds (Sample B) and both were incubated at 25° C. for 48 h. The physical characteristics of the anolyte dilutions are shown in Table 4. The results are summarized in Table 5 and represent a graded and proportionate evaluation of microorganism viability after exposure to Anolyte and culture on a dedicated growth medium.

TABLE 4

Physical characteristics of anolyte dilutions

| Dilution | EC | ORP |
|---|---|---|
| Control (0%) | 7.52 | 026 |
| Neat (100%) | 5.78 | 899 |
| 1:10 | 6.02 | 723 |
| 1:20 | 6.04 | 848 |
| 1:50 | 5.27 | 634 |
| 1:100 | 5.75 | 583 |
| 1:1000 | 5.77 | 529 |
| 1:10 000 | 5.74 | 495 |

Results

Sample A details the viability of aerobic bacteria on the surface of maize kernels treated with progressive dilutions of Anolyte while sample B details the viability of yeast and moulds on the surface of maize kernels treated with progressive dilutions of anolyte.

TABLE 5

Efficacy of anolyte in controlling surface micro-flora of maize kernels. Results are presented as number of kernels showing regrowth on fungal specific culture media after 8 minutes exposure to anolyte

| Dilution | Sample A | Sample B |
|---|---|---|
| Control (0%) | 5/5 | 5/5 |
| Neat (100%) | 1/5 | 0/5 |
| 1:10 | 2/5 | 0/5 |
| 1:20 | 1/5 | 0/5 |
| 1:50 | 2/5 | 0/5 |
| 1:100 | 2/5 | 0/5 |
| 1:1000 | 5/5 | 5/5 |
| 1:10 000 | 5/5 | 5/5 |

Legend:
5/5 no antimicrobial effect
0/5 absolute antimicrobial effect.

Conclusion

Anolyte was in general more effective against moulds and yeasts than aerobic bacteria.
Sample B: Anolyte was effective against moulds and yeasts at least up to 1:100 dilution.
Sample A: Anolyte was moderately effective against aerobic bacteria at least up to 1:100 dilution.

EXAMPLE 4

Anolyte's Effects on Mycotoxins in Maize and Groundnuts

Methodology

Loose maize or corn grains of variable levels of field acquired mycotoxin contamination were exposed to different permutations of anolyte and catholyte exposure—either separately or in combinations. The levels of mycotoxin present on the surface of the grains, both before and after treatment with the anolyte and/or catholyte solutions, were determined in accordance with the instructions of the VICAM aflatest and fumonitest kits. The anolyte solution had an ORP of ≧+900 mV and a pH of 6.5-6.7 and the catholyte solution had an ORP of from −800 mV to −950 mV, and pH 11 to 12, and the solutions were applied at ambient temperature and standard pressure and all samples were exposed to the treatment solutions for 15 minute periods. Where there were tandem treatments i.e. Catholyte washing repeated, the grains were drained until there was no further run-off before being exposed to the following solution. In addition, the anti-mycotoxic capacity of Catholyte generated from Sodium Chloride was contrasted against a Catholyte produced from Sodium Bicarbonate.

Results

TABLE 6

Percentage change in superficial Aflatoxin concentration on maize and groundnuts after exposure to a variety of ECA solutions.

Maize

| | Ppb Aflatoxin | % reduction |
|---|---|---|
| Control | 430 | |
| 15 min C + C | 3 | 99 |
| Control | 510 | |
| 15 min C + C | 99 | 81 |
| | ppb Fumonisins | |
| Control | 1.3 | |
| 100% C | 0.32 | 75 |
| 1:10 C | 0.6 | 54 |
| 1:100 C | 0.46 | 65 |
| Control | 7.8 | |
| Neutral A1 | 6.4 | 18 |
| C1 | 3 | 62 |
| Acidic A1 | 8.6 | −10 |

Legend:
15 min C + C = Undiluted Catholyte exposure for 15 minutes, decant and repeat with fresh Catholyte for a further 15 minutes,
1:10 C = Catholyte diluted 1:10 in tap water,
Neutral A1 = NaCl Anolyte - pH 7,
Acidic A1 = NaCl Anolyte pH 5.5.
NB - all exposures are 15 minutes.

Groundnut cakes

| | Ppb Aflatoxin | % reduction |
|---|---|---|
| Control | 1200 | |
| 15 min C1 C1 | 430 | 64 |
| 15 min A1 A1 | 560 | 53 |

Whole nuts (Shelled)

| | Temp | ppb Aflatoxin | % reduction |
|---|---|---|---|
| Control | | 28 | |
| 15 min C1 - whole nut | 40 | 3 | 89 |
| 15 min C2 - whole nut | 40 | 2 | 91 |

Legend:
A1 = saline-based anolyte;
C1 = saline-based catholyte;
C2 = bicarbonate-based catholyte,
15 min = 15 minutes exposure to each solution type.

Conclusion

Treatment of the mycotoxin contaminated grains with catholyte solutions can substantially reduce levels of both Aflatoxin and Fumonisin in maize grains, and Aflatoxin levels in both whole ground nuts and derivative oil cake products. There was an insignificant difference between the mycotoxin detoxifying capabilities of Catholyte generated from either Sodium Chloride and Sodium Bicarbonate. It would appear that Bicarb generated Catholyte was more effective for Mycotoxin reduction than Saline based Catholyte. Anolyte was not reliably effective for the reduction of superficial mycotoxin removal on either maize grains or ground nuts.

EXAMPLE 5

Wheat Conditioning and Baking Trial

Methodology

High protein ('Hard') wheat grain was obtained from a commercial mill and assessed under a variety of treatment permutations to evaluate the effect of anolyte when added to conditioning water, as well as the bake quality of anolyte-conditioned grain flour in comparison to an untreated control. The anolyte used in the conditioning assessment (S1) was generated using a pre-activation solution 2.5 gm/liter Sodium Chloride, and had an ORP $\geq 900$ mV, an EC $\leq 5.2$ mS/cm and a pH of 6.7. The Anolyte was added at the prescribed rate required to obtain a final conditioning moisture content of 16% and the conditioning solution had an anolyte inclusion rate of either 35 or 50% and was made up to final strength with standard tap water.

The Anolyte used in the baking assessment (S2) was generated from 3.0 gm/lit Sodium bicarbonate pre-activation solution, and had an ORP $\geq 800$ mV, an EC $\leq 6$ mS/cm and a pH of 6.9.

To exclude the likely impact of microbial contamination, the grains of one untreated control group were irradiated with a total exposure of 25 kGy to ensure optimal decontamination, whereafter the grains were conditioned with sterile water to maintain an aseptic treatment environment. The conditioning solutions were applied as a direct surface spray and the grains were agitated with a screw conveyor to ensure optimal exposure to the solution. After conditioning (sterile water, tap water and Anolyte at 35 and 50%), all treated grains were allowed to stand (steep) for 48 hours under ambient conditions in a sealed container. The conditioned grains were then milled according to global standard practice (Chorleywood) in a Buhler laboratory-scale milling device which was cleaned and decontaminated before each of the different treatment samples was milled. The processed flours were then submitted to internationally recognized baking standards for direct comparison of the final bake quality. The evaluations were conducted in strict compliance with the standard baking test (Industry accepted method 018). The Bread Score Report was conducted in accordance with the internationally recognized Chorleywood Process.

Results

TABLE 7

Standard baking parameters of white wheat flour bread after treatment of the conditioning water with Anolyte at two inclusion rates against two untreated control groups.

| Sample | (1) Sterile water Sterile wheat | (2) Control Tap water | (3) Grain - 50% S1 Flour - Tap water | (4) Grain - 35% S1 Flour - Tap water | (5) Grain - 35% S1 Flour - 50% S2 | (6) Mill Flour 50% S2 |
|---|---|---|---|---|---|---|
| Extraction % (Method 011, 012) | 79.4 | 79.3 | 79.8 | 78.4 | 75 | |
| Flour Moisture % (ICC 110/1, 1976) | 13.1 | 13 | 13 | 14.3 | 13.5 | 13.1 |
| Flour Protein % (AACC 46-30, 1999) | 12.16 | 12.15 | 12.28 | 12.29 | 11.25 | 11.97 |
| Flour falling no (ICC 107/1, 1995) | 236 | 342 | 347 | 352 | 343 | 338 |
| Color KJ (FMBRA, FTP 0007/3, 7/1991) | 0.4 | −1.2 | −0.7 | −1.7 | −1.1 | 1 |
| Flour ash (in-house method IH 011) | 0.61 | 0.59 | 0.59 | 0.53 | | |
| Farinogram (AACC 54-21, 1999, Constant Flour Weight Procedure) | | | | | | |
| Absorption % | 68.8 | 66 | 66.7 | 66.5 | | |
| Development time (min) | 5.2 | 7.4 | 5.8 | 7.7 | | |
| Stability (min) | 5.3 | 10 | 8.7 | 9.9 | | |
| Tolerance index | 56 | 34 | 40 | 39 | | |
| Alveogram (ICC 121, 1992) | | | | | | |
| Strength cm$^2$ | 32 | 50.5 | 43 | 48.9 | 40.4 | 52.4 |
| Stability (mm) | 87 | 98 | 92 | 97 | 92 | 117 |
| Distensibility (mm) | 84 | 114 | 101 | 108 | 96 | 85 |
| P/L value | 1.03 | 0.86 | 0.92 | 0.9 | 0.96 | 1.38 |
| Mixogram (Industry accepted method 020) | | | | | | |
| Peak time (min) | 2 | 2.3 | 2.5 | 2.5 | 2.7 | 33 |
| Absorption % (14% MB) | 62.4 | 62.4 | 62.6 | 62.6 | 61.3 | 62.2 |
| Consistogram AH (AACC 54-50, 1999) PR Max Target 1700 | | | | | | |
| WAC % b14 | 65.8 | 65.4 | 66.4 | 66.2 | | |
| PrMax | 1558 | 1638 | 1534 | 1696 | | |

TABLE 7-continued

Standard baking parameters of white wheat flour bread after treatment of the conditioning water with Anolyte at two inclusion rates against two untreated control groups.

| Sample | (1) Sterile water Sterile wheat | (2) Control Tap water | (3) Grain - 50% S1 Flour - Tap water | (4) Grain - 35% S1 Flour - Tap water | (5) Grain - 35% S1 Flour - 50% S2 | (6) Mill Flour 50% S2 |
|---|---|---|---|---|---|---|
| Baking test (700 gm) (Industry accepted standard 018) | | | | | | |
| Baking water absorption (%) | 60 | 60 | 60 | 60 | 58 | 61 |
| Dough characteristics | Soft-sticky | Normal | Normal | Normal | Normal | Normal-Soft |
| Loaf volume cm$^3$ | 2850 | 2950 | 3220* | 3220* | 3150** | 2925 |
| Score % | 76 | 78 | 80 | 82 | 80 | 71 |
| Drop test | yes | Yes | Yes | Yes | | |
| Instron (Bread Firmness) (AACC 74) | | | | | | |
| 0 hours | | | | | 1.48 (1.42) | 2.1 (1.88) |
| 24 hours | 5.69 | 4.97 | 3.5 (+29.5%) | 2.83 (+43%) | 3.41 | 3.63 |
| 48 hours | 6.91 | 7.06 | 3.78 (+46.5) | 4.35 (+38.3%) | 4.67 | 4.48 |
| 72 hours | 7.69 | 8.34 | 5.62 (+32.6%) | 4.38 (+47.4%) | 5.89 | 5.75 |
| 96 hours | 8.49 | 9.02 | 5.98 (+33.7%) | 5.72 (+36.6%) | 5.9 (6.25) | 6.78 (7.44) |
| Protein factor | 5.7 | 5.7 | 5.7 | 5.7 | | |

Legend:
S1 - Saline Anolyte,
S2 - Sodium Bicarbonate anolyte,
Mill flour - commercial flour from a mill,
*9.15% increase in the finished volumetric size of the baked product over column (2) and a 12.98% increase in finished volumetric size over column (1).
**6.78% increase in the finished volumetric size of the baked product over column (2) and a 10.53% increase in finished volumetric size over column (1).

While the quality of the bread derived from the different treatment groups did not differ in terms of macroscopic evaluation, there was a significant increase in the staling or Bread firmness index as detailed by the Instron results. In both cases of anolyte conditioning treatment i.e. 35% and 50%, there was a highly significant reduction in the deterioration of the bread shelf-life quality as reflected by an increase in cut surface compressibility over a four day period relative to either the loaf prepared under aseptic conditions or that baked in accordance with standard or commercial practices.

Where Sodium Bicarbonate Anolyte (S2) was used as an ingredient i.e. last two columns on the right, one was able to confirm the reduction in the Instron staling test and thus enhanced shelf life quality, reaffirming the capability of the Anolyte to favorably increase both the volume of the baked loaf as well as shelf life both through enhanced bake quality and microbial control. The results similarly confirm the safety of using the anolyte solutions (NaCl & NaHCO$_3$) without adversely impacting upon the viability or fermentative performance of the commercial yeast ingredients.

Discussion

These results strongly suggest that exposure of wheat grains during conditioning will consistently result in an increase in bread volume where anolyte is included in the process, as well as a significant increase in keeping quality as reflected through the substantially different bread firmness criteria as dictated by international standard (AACC 74-09, 1996).

The applicant believes that intervention with the oxidant anolyte solution according to the invention, catalyzes catabolic activity of the intrinsic alpha-amylase enzymes necessary for the cleaving of discrete molecules of starch compounds as readily available fermentable sugars to drive the anaerobic fermentation. Addition of the anolyte solution during the baking process has no adverse effect on commercial yeast strains, and provides sufficient redox potential to reduce wild strain and in-process contaminants. The anolyte may be responsible for disrupting thiol disulphide bonds, resulting in the production of an optimal gluten structure during the baking process. Accordingly it may promote enhanced fermentation by the commercial strains of yeast used as an ingredient through optimized competitive exclusion, and may also ensure the production of a final baked product with reduced levels of spoilage microbes which may otherwise result in reduced shelf-life.

Moreover, the anolyte of the invention can be introduced as a core ingredient of a baking mix with a plurality of functions, inclusive of water decontamination, flour bleaching, starch mobilization and maturation, and as such it provides a means to replace dependence on bromate-based and equivalent carcinogenic oxidants as additives in the baking process.

Conclusion

The introduction of its oxidant anolyte solution will effect optimal superficial decontamination of the raw grain surface, thereby permitting grain processing and subsequent widespread distribution under conditions wherein increased humidity, and thus moisture content of the product, and elevated temperatures, which are normally ideally suited to promoting growth of spoilage microbes inclusive of toxigenic fungi, would be reduced with a resultant increase in shelf life and the consequently enhanced capacity for distribution over a wider geographic area previously unfeasible due to a limited shelf life.

The anolyte solution of the invention provides an added benefit in that, in addition to its broad based antimicrobial efficacy, it is able simultaneously to sanitize steeping equipment, such as screw conveyors and hydrators, as well as downstream processing and milling equipment—a simultaneous "in-process" plant and product disinfectant, as it were.

It will be appreciated that many other embodiments of the invention may be possible without departing from the spirit or scope of the invention.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. A method of processing grain comprising the steps of:
   (a) applying an aqueous conditioning fluid to said grain, prior to milling, in a manner effective to increase a moisture content of said grain without causing said moisture content of said grain to exceed 20% by weight, said aqueous conditioning fluid at least partially comprising an aqueous anolyte product wherein, when in undiluted form, said aqueous anolyte product has a pH in a range of from about 5.5 to about 7.5 and a positive oxidation-reduction potential of at least $^{+}550$ mV and then
   (b) dry milling said grain to produce a milled product,
   said process being conducted at ambient conditions during step (a) and between step (a) and step (b) and
   said aqueous anolyte product being present in said aqueous conditioning fluid in an amount effective to at least reduce growth of toxigenic fungi on said grain.

2. The method of claim 1 further comprising the steps, after step (a) and prior to step (b), of:
   removing at least an outer layer from said grain and
   removing a grain germ material from said grain.

3. The method of claim 1 wherein said aqueous conditioning fluid is a diluted anolyte composition comprising said aqueous anolyte product and non-electrochemically activated water, said aqueous anolyte product being present in said diluted anolyte composition in a concentration of at least 1% by weight and said non-electrochemically activated water being present in said diluted anolyte composition in a concentration of at least 50% by weight.

4. The method of claim 1 wherein said aqueous anolyte product has a free active oxidant concentration of less than 250 ppm.

5. The method of claim 1 wherein said aqueous anolyte product is an anode product which has been produced by electrochemical activation of an aqueous salt solution comprising from about 1 to about 9 grams of salt per liter of water, wherein said salt is sodium chloride, sodium carbonate, or sodium bicarbonate.

6. The method of claim 1 wherein, when in undiluted form, said aqueous anolyte product has a positive oxidation-reduction potential of at least $^{+}650$ mV.

7. The method of claim 1 wherein, when in undiluted form, said aqueous anolyte product has a pH in a range of from about 6.5 to about 7.5.

8. The method of claim 1 wherein said moisture content of said grain is increased in step (a) to a value in a range of from 13% to 18% by weight.

9. The method of claim 1 wherein said moisture content of said grain prior to step (a) is sufficiently low that said toxigenic fungi are dormant prior to said aqueous conditioning fluid being applied to said grain in step (a).

10. The method of claim 1 wherein said grain is wheat grain.

11. The method of claim 1 wherein step (a) comprises:
    spraying said aqueous conditioning fluid onto said grain and
    agitating said grain such that said aqueous conditioning fluid is absorbed by said grain.

12. In a method comprising the steps of forming a dough comprising flour and yeast and baking said dough to produce a baked product having a finished volumetric size per a given weight amount of said flour used in forming said dough, the improvement comprising said flour used in forming said dough being a flour product which was produced by a process comprising the steps of:
    (a) applying an aqueous conditioning fluid to grain, prior to milling, in a manner effective to increase a moisture content of said grain without causing said moisture content of said grain to exceed 20% by weight, said aqueous conditioning fluid at least partially comprising an amount of an aqueous anolyte product wherein, when in undiluted form, said aqueous anolyte product has a pH in a range of from about 5.5 to about 7.5 and a positive oxidation-reduction potential of at least $^{+}550$ mV and then
    (b) milling said grain,
    wherein said aqueous anolyte product being present in said aqueous conditioning fluid used in step (a) is in an amount effective for altering a fermentable sugar composition of said flour product in a manner such that said finished volumetric size of said baked product per said given weight amount of said flour used in forming said dough is increased.

13. The method of claim 12 wherein said amount of said aqueous anolyte product in said aqueous conditioning fluid is effective for altering said fermentable sugar composition of said flour product in a manner such that said finished volumetric size of said baked product per said given weight amount of said flour used in forming said dough is increased by at least 6.78%.

14. The method of claim 12 wherein said amount of said aqueous anolyte product in said aqueous conditioning fluid is effective for altering said fermentable sugar composition of said flour product in a manner such that said finished volumetric size of said baked product per said given weight amount of said flour used in forming said dough is increased by at least 9.15%.

15. The method of claim 12 wherein said amount of said aqueous anolyte product in said aqueous conditioning fluid is effective for altering said fermentable sugar composition of said flour product in a manner such that said finished volumetric size of said baked product per said given weight amount of said flour used in forming said dough is increased by at least 10.53%.

16. The method of claim 12 wherein said process which was used for forming said flour product further comprised the steps, after step (a) and prior to step (b), of:
    removing at least an outer layer from said grain and
    removing a grain germ material from said grain.

17. The method of claim 12 wherein said aqueous conditioning fluid is a diluted anolyte composition comprising said aqueous anolyte product and non-electrochemically activated water, said aqueous anolyte product being present in said diluted anolyte composition in a concentration of at least 1% by weight and said non-electrochemically activated water being present in said diluted anolyte composition in a concentration of at least 50% by weight.

18. The method of claim 12 wherein said aqueous anolyte product has a free active oxidant concentration of less than 250 ppm.

19. The method of claim 12 wherein said aqueous anolyte product is an anode product which has been produced by electrochemical activation of an aqueous salt solution comprising from about 1 to about 9 grams of salt per liter of water, wherein said salt is sodium chloride, sodium carbonate, or sodium bicarbonate.

20. The method of claim 12 wherein, when in undiluted form, said aqueous anolyte product has a positive oxidation-reduction potential of at least $^+$650 mV.

21. The method of claim 12 wherein, when in undiluted form, said aqueous anolyte product has a pH in a range of from about 6.5 to about 7.5.

22. The method of claim 12 wherein said process by which said flour product was produced was conducted at ambient conditions during step (a) and between step (a) and step (b).

23. The method of claim 12 wherein said process by which said flour product was produced was conducted such that said moisture content of said grain is increased in step (a) to a value in a range of from 13% to 18% by weight.

24. The method of claim 12 wherein said grain is wheat grain.

25. The method of claim 12 wherein step (a) comprised:
   spraying said aqueous conditioning fluid onto said grain and
   agitating said grain such that said aqueous conditioning fluid was absorbed by said grain.

26. The method of claim 12 wherein said grain was dry milled in step (b).

* * * * *